United States Patent
Maeda

(10) Patent No.: US 9,377,975 B2
(45) Date of Patent: Jun. 28, 2016

(54) PRINTING APPARATUS, CONTROL METHOD THEREOF, AND STORAGE MEDIUM

(71) Applicant: CANON KABUSHIKI KAISHA, Tokyo (JP)

(72) Inventor: Yuuki Maeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/630,596

(22) Filed: Feb. 24, 2015

(65) Prior Publication Data

US 2015/0254029 A1    Sep. 10, 2015

(30) Foreign Application Priority Data

Mar. 4, 2014   (JP) .................................. 2014-041938

(51) Int. Cl.
*G06K 15/00* (2006.01)
*G06F 3/12* (2006.01)

(52) U.S. Cl.
CPC ............ *G06F 3/1212* (2013.01); *G06F 3/1204* (2013.01); *G06F 3/1234* (2013.01); *G06F 3/1267* (2013.01); *G06F 3/1297* (2013.01); *G06K 15/002* (2013.01); *G06K 15/408* (2013.01); *G06K 15/4025* (2013.01)

(58) Field of Classification Search
None
See application file for complete search history.

(56) References Cited

U.S. PATENT DOCUMENTS

| 7,976,011 | B2 | 7/2011 | Shibuya |
| 8,009,323 | B2 | 8/2011 | Sato et al. |
| 8,368,922 | B2 | 2/2013 | Maeda |
| 8,619,307 | B2 | 12/2013 | Maeda |
| 2003/0095280 | A1* | 5/2003 | Sunada .............. H04N 1/00411 358/1.14 |
| 2014/0167345 | A1 | 6/2014 | Maeda |

FOREIGN PATENT DOCUMENTS

| JP | 2006-35751 A | 2/2006 |
| JP | 2008-222399 A | 9/2008 |

* cited by examiner

*Primary Examiner* — Dov Popovici
(74) *Attorney, Agent, or Firm* — Fitzpatrick, Cella, Harper & Scinto

(57) ABSTRACT

The present invention provides a technique for enabling a printing apparatus to quickly restart execution of a job that has been interrupted by a specific interruption instruction. If an instruction to accept a setting change of the job that is being executed is received during execution of the job as a specific interruption instruction indicating that the execution of the job needs to be interrupted, the printing apparatus interrupts execution of the job. If a preparation operation for executing the job is being executed at the time of interruption of the job, a printing system controls the device which is performing the preparation operation so as to continue the preparation operation without interrupting the preparation operation.

10 Claims, 11 Drawing Sheets

PRINTING APPARATUS, CONTROL METHOD THEREOF, AND STORAGE MEDIUM

BACKGROUND OF THE INVENTION

1. Field of the Invention

The present invention relates to a printing apparatus such as a printer or a digital multifunction peripheral, a control method thereof, and a storage medium.

2. Description of the Related Art

A printing system such as a POD (Print on Demand) system that performs highly productive and highly efficient print processing includes a large-format printing apparatus, and various types of sheet feeding apparatuses and sheet processing apparatuses are connected to the system. Such sheet feeding apparatuses and sheet processing apparatuses may require some time to perform a preparation operation that can lead to a reduction of productivity, and thus a technique is used to increase the productivity as much as possible. For example, a technique is proposed in, for example, Japanese Patent Laid-Open No. 2006-035751, in which when a print job is received, interpretation is performed on the print job, and then it is determined which sheet processing apparatus and which sheet feeding apparatus are used to execute processing and at which timing the processing is executed. Then, before execution of the processing actually starts, control is performed so as to perform in advance a preparation operation for the sheet processing apparatus or the sheet feeding apparatus determined to be used. Another technique is also proposed in, for example, Japanese Patent Laid-Open No. 2008-222399 in which as a preparation operation of a sheet feeding apparatus, air is blown to sheets loaded in the sheet feeding apparatus so as to convey the sheets sequentially from the topmost sheet separated from the sheets. In such a conventional printing system, if an interruption instruction to interrupt a job is received during execution of the job, the preparation operation of the sheet feeding apparatus (sheet feeding cassette) or the like is stopped.

Meanwhile, in recent years, a printing system is proposed that receives a specific interruption instruction issued to make a change in the settings. Such a printing system interrupts (temporarily stops) execution of a job if a specific interruption instruction is received, and if the user partially changes the settings of the job through a PC or the like during interruption of the job, the printing system restarts the job based on the changed settings. The specific interruption instruction is different from the conventional interruption instruction in that it is possible to make a change in the settings of a job that has already started to be executed.

However, with the specific interruption instruction described above, although the settings of a job can be changed after the execution of the job has started, not only the execution of the job is stopped, but also a preparation operation for the job is stopped. For this reason, the aforementioned interruption instruction is problematic in that it is necessary to again execute the preparation operation when the execution of the job is restarted after a change is made to the settings, which takes time to actually restart the execution of the job.

SUMMARY OF THE INVENTION

The present invention has been made in view of the problems described above. The present invention provides a technique for enabling a printing apparatus to quickly restart execution of a job that has been interrupted by a specific interruption instruction.

According to one aspect of the present invention, there is provided a printing apparatus comprising: an execution unit configured to, upon accepting a job that needs to be executed, start a preparation operation of a device to be used in the job and start execution of the job; an accepting unit configured to accept an interruption instruction during the execution of the job, the interruption instruction indicating that the execution of the job needs to be interrupted; an interrupting unit configured to interrupt the execution of the job upon accepting the interruption instruction by the accepting unit; and a control unit configured to, in a case where the preparation operation of the device to be used in the job is being executed at a time when the execution of the job is interrupted by the interrupting unit, control the device so as to continue the preparation operation without interrupting the preparation operation.

According to another aspect of the present invention, there is provided a control method for controlling a printing apparatus, the method comprising steps of: upon accepting a job that needs to be executed, starting a preparation operation of a device to be used in the job and starting execution of the job; accepting an interruption instruction during the execution of the job, the interruption instruction indicating that the execution of the job needs to be interrupted; interrupting the execution of the job upon accepting the interruption instruction in the accepting step; and controlling, in a case where the preparation operation of the device to be used in the job is being executed at a time when the execution of the job is interrupted in the interrupting step, the device so as to continue the preparation operation without interrupting the preparation operation.

According to still another aspect of the present invention, there is provided a non-transitory computer-readable storage medium storing a computer program for causing a computer to execute steps of a control method for controlling a printing apparatus, the method comprising steps of: upon accepting a job that needs to be executed, starting a preparation operation of a device to be used in the job and starting execution of the job; accepting an interruption instruction during the execution of the job, the interruption instruction indicating that the execution of the job needs to be interrupted; interrupting the execution of the job upon accepting the interruption instruction in the accepting step; and controlling, in a case where the preparation operation of the device to be used in the job is being executed at a time when the execution of the job is interrupted in the interrupting step, the device so as to continue the preparation operation without interrupting the preparation operation.

According to the present invention, it is possible to provide a technique for enabling a printing apparatus to quickly restart execution of a job that has been interrupted by a specific interruption instruction.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

System Configuration

Figure 1:
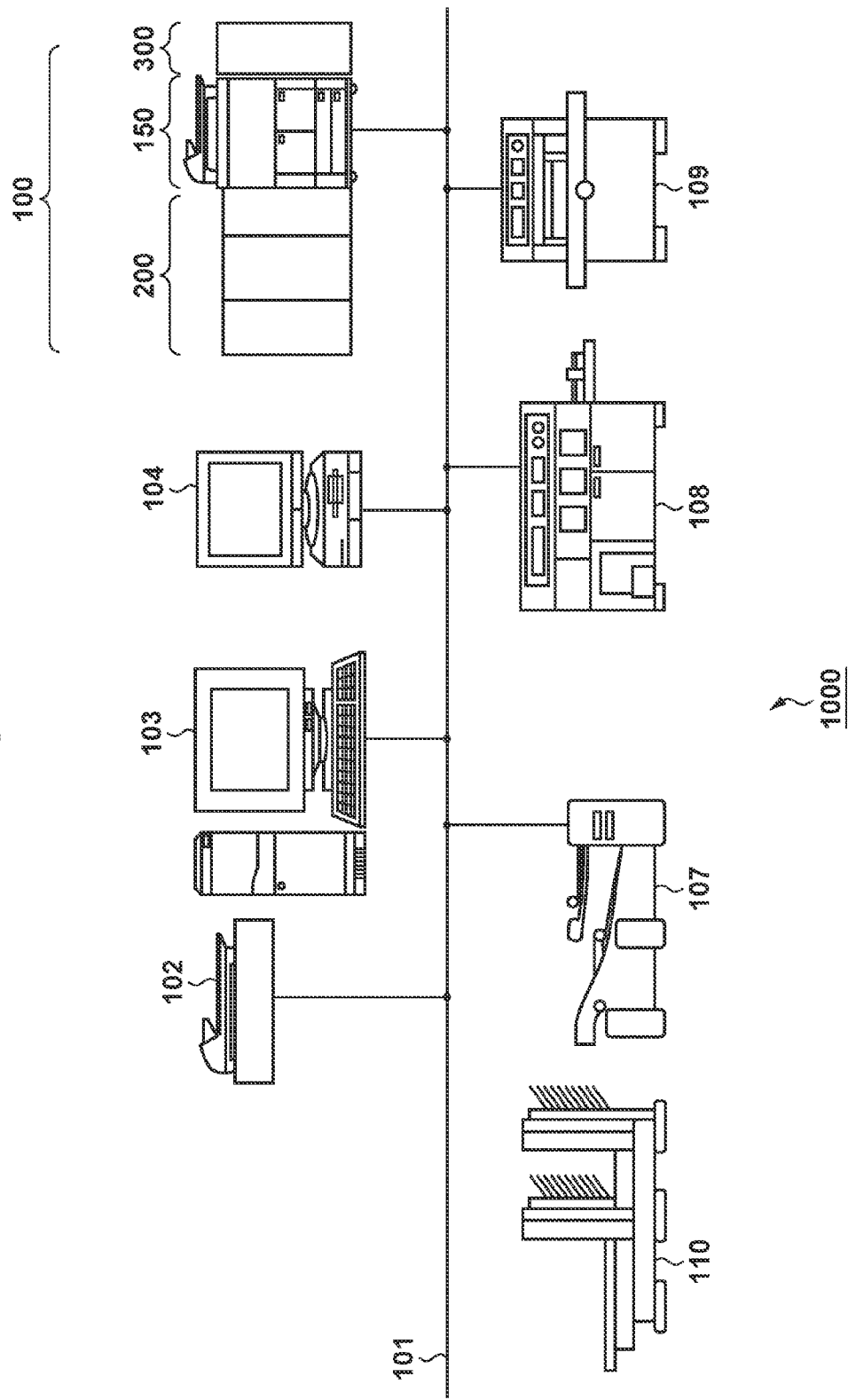
FIG. 1 is a diagram showing an example of a configuration of a POD system 1000 including a printing system 100.

FIG. 1 is a diagram showing an example of a configuration of a POD system 1000 including a printing system 100. The POD system 1000 includes the printing system 100, a server PC (personal computer) 103 and a client PC 104. The POD system 1000 further includes a scanner 102, a sheet folding apparatus 107, a case binding apparatus 108, a sheet cutting apparatus 109 and a saddle stitching apparatus 110. As described above, the POD system 1000 is composed of a large number of apparatuses. In the embodiments described in this specification, the printing system 100 is an example of a printing apparatus.

The printing system 100 includes a printing apparatus main body (hereinafter referred to simply as a "printing apparatus") 150, sheet processing apparatuses (post-processing apparatuses) 200 and a sheet feeding apparatus 300. The printing apparatus 150 is a multifunction peripheral (MFP) having a plurality of functions such as a copy function and a print function. However, the printing apparatus 150 may be a single-function printing apparatus having only, for example, a copy function or a print function.

The sheet processing apparatuses 200 are apparatuses capable of executing sheet processing on sheets that have undergone print processing by the printing apparatus 150. However, the sheet folding apparatus 107, the case binding apparatus 108, the sheet cutting apparatus 109 and the saddle stitching apparatus 110 are also apparatuses capable of executing sheet processing on the sheets that have undergone print processing by the printing apparatus 150, and thus they are also classified as sheet processing apparatuses.

The sheet folding apparatus 107 executes folding processing on the sheets that have undergone print processing by the printing apparatus 150. The sheet cutting apparatus 109 executes cutting processing on the sheets that have undergone print processing by the printing apparatus 150 on a bundle-by-bundle basis, the bundle being composed of a plurality of sheets. The saddle stitching apparatus 110 executes saddle stitching processing on the sheets that have undergone print processing by the printing apparatus 150. The case binding apparatus 108 executes case binding processing on the sheets that have undergone print processing by the printing apparatus 150.

However, in order to execute each sheet processing in the sheet folding apparatus 107, the case binding apparatus 108, the sheet cutting apparatus 109 and the saddle stitching apparatus 110, it is necessary for the operator to set the sheets that have undergone print processing by the printing apparatus 150 directly in each apparatus. In other words, the operator needs to manually remove sheets from a sheet discharge unit of the printing apparatus 150 and then set the sheets in a sheet processing apparatus that performs sheet processing on the sheets. Meanwhile, the sheet processing apparatuses 200 are connected directly to the printing apparatus 150, and thus it can directly receive supply of sheets from the printing apparatus 150. Accordingly, the sheet processing apparatuses 200 can execute sheet processing on the sheets that have undergone print processing by the printing apparatus 150 without requiring the operator to perform a manual operation as described above.

The sheet feeding apparatus 300 is capable of housing a large number of sheets. The sheet feeding apparatus 300 is connected to the printing apparatus 150, and is capable of feeding sheets to the printing apparatus 150 so as to subject the sheets to print processing by the printing apparatus 150.

As shown in FIG. 1, in the POD system 1000, the apparatuses except the saddle stitching apparatus 110 are connected to a network 101, and thus are capable of data communication with other apparatuses connected to the network 101. The server PC 103 and the client PC 104 are capable of generating a print job including a request to execute print processing, and transmitting the print job to the printing apparatus 150 (the printing system 100). The server PC 103 may manage jobs that need to be processed in the POD system 1000. For example, the server PC 103 may manage the steps of a series of work flow including a plurality of processing steps. Also, the server PC 103 determines the settings of post-processing that needs to be executed in the POD system 1000 based on the job accepted from the operator, and causes each sheet processing apparatus (post-processing apparatus) to execute post-processing according to the settings.

Hardware Configuration of Printing System 100

Figure 2:
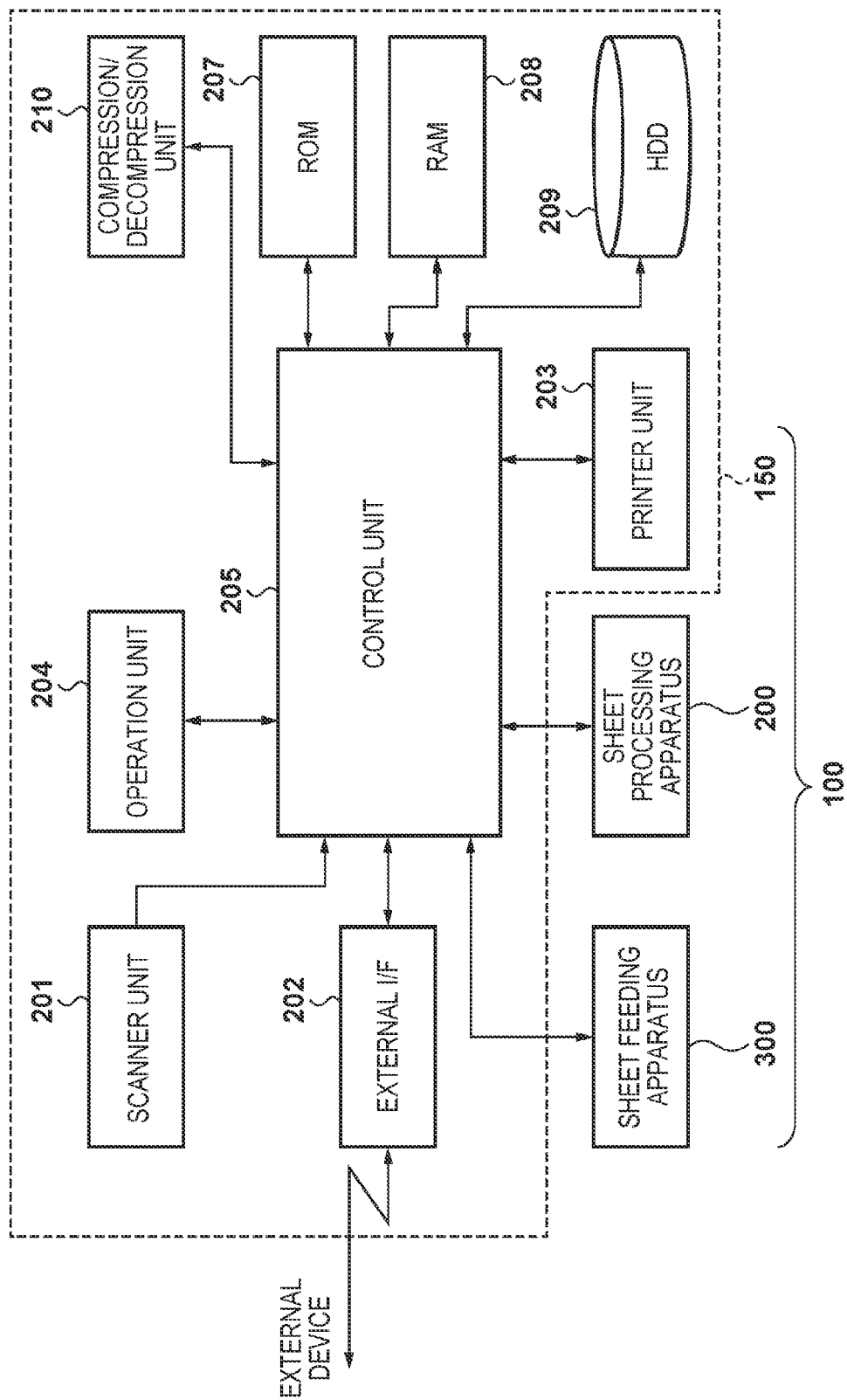
FIG. 2 is a block diagram showing an example of a hardware configuration of the printing system 100.

FIG. 2 is a block diagram showing an example of a hardware configuration of the printing system 100. As shown in FIG. 2, the printing system 100 includes the printing apparatus 150, the sheet processing apparatus 200 and the sheet feeding apparatus 300. The sheet processing apparatus 200 is an in-line finisher that can optionally be removably attached to the printing apparatus 150. The sheet feeding apparatus 300 can also optionally be removably attached to the printing apparatus 150. The printing apparatus 150 can be connected to any number of sheet processing apparatuses 200 each capable of executing specific post-processing (sheet processing). The printing system 100 is an example of the printing apparatus. It is also possible to configure the printing system 100 by using the printing apparatus 150 alone without connecting the sheet processing apparatuses 200 and the sheet feeding apparatus 300 thereto. In this case, the printing apparatus 150 is an example of the printing apparatus.

Printing Apparatus 150

The printing apparatus 150 includes a control unit 205 including a CPU. The printing apparatus 150 further includes a scanner unit 201, an external interface (I/F) 202, a printer unit 203, an operation unit 204, a ROM 207, a RAM 208, a hard disk drive (HDD) 209 and a compression/decompression unit 210 that are connected to the control unit 205.

The control unit 205 controls the operations of the units (apparatuses) included in the printing system 100. In other words, the control unit 205 controls not only the operations of the printing apparatus 150 but also the operations of the sheet processing apparatus 200 and the sheet feeding apparatus 300 that are connected to the printing apparatus 150.

The ROM 207 is a read-only memory. A boot program, font information, various computer programs executed by the control unit 205, and the like are stored in the ROM 207. For example, a program for causing the control unit 205 to execute various processing operations of flowcharts described later, and a display control program required to display various setting screens on the operation unit 204 are stored in the ROM 207. A program for executing operations of interpreting page-description language (PDL) code data received from the server PC 103, the client PC 104 or the like and rendering the code data into raster image data (bitmap image data) is also stored in the ROM 207.

The RAM 208 is a readable and writable memory. Image data transmitted from the scanner unit 201 or the external I/F 202 is stored in the RAM 208. Also, the RAM 208 is used as a work area by the control unit 205. The control unit (CPU) 205 controls the operations of the units (apparatuses) included in the printing system 100 by reading a program, settings information and the like stored in the ROM 207 or the HDD 209 into the RAM 208 and executing the read program. The HDD 209 is a large-capacity storage apparatus for storing image data input from the scanner unit 201 or the external I/F 202 and a job (print job or the like) to be processed.

The scanner unit 201 reads an image on an original so as to generate image data, and outputs the image data to the control unit 205. The external I/F 202 is connected to the network 101, and performs data transmission and reception with respect to external apparatuses (the server PC 103, the client PC 104 and the like) capable of communication via the network 101. The printer unit 203 prints images onto sheets based on the image data input from the control unit 205. The operation unit 204 functions as a user interface (UI) of the printing system 100, which will be described later with reference to FIG. 4.

The control unit 205 stores image data input via the scanner unit 201 or the external I/F unit 202 into the HDD 209, and transmits the image data to an external apparatus (the server PC 103 or the like) via the external I/F 202. The control unit 205 causes the printer unit 203 to print images onto sheets based on the image data stored in the HDD 209. Also, the control unit 205 generates a job (a print job or the like) that needs to be executed in the printing system 100 based on an instruction sent from the user via the operation unit 204, or receives a job from an external apparatus (the server PC 103 or the like) via the external I/F 202. The control unit 205 controls the operations of the devices (apparatuses) included in the printing system 100 so as to execute processing according to the generated or received job.

The compression/decompression unit 210 performs compression and decompression processing on the image data stored in the RAM 208 or the HDD 209 based on various compression schemes such as JBIG and JPEG.

The sheet processing apparatus 200 is connected to the printing apparatus 150 so as to be capable of communication with each other, and is capable of executing sheet processing, which will be described later, in accordance with an instruction from the printing apparatus 150. The sheet feeding apparatus 300 is connected to the printing apparatus 150 so as to be capable of communication with each other, and is capable of feeding sheets, which are to be used in print processing performed by the printing apparatus 150, to the printing apparatus 150 in accordance with an instruction from the printing apparatus 150.

Figure 3:
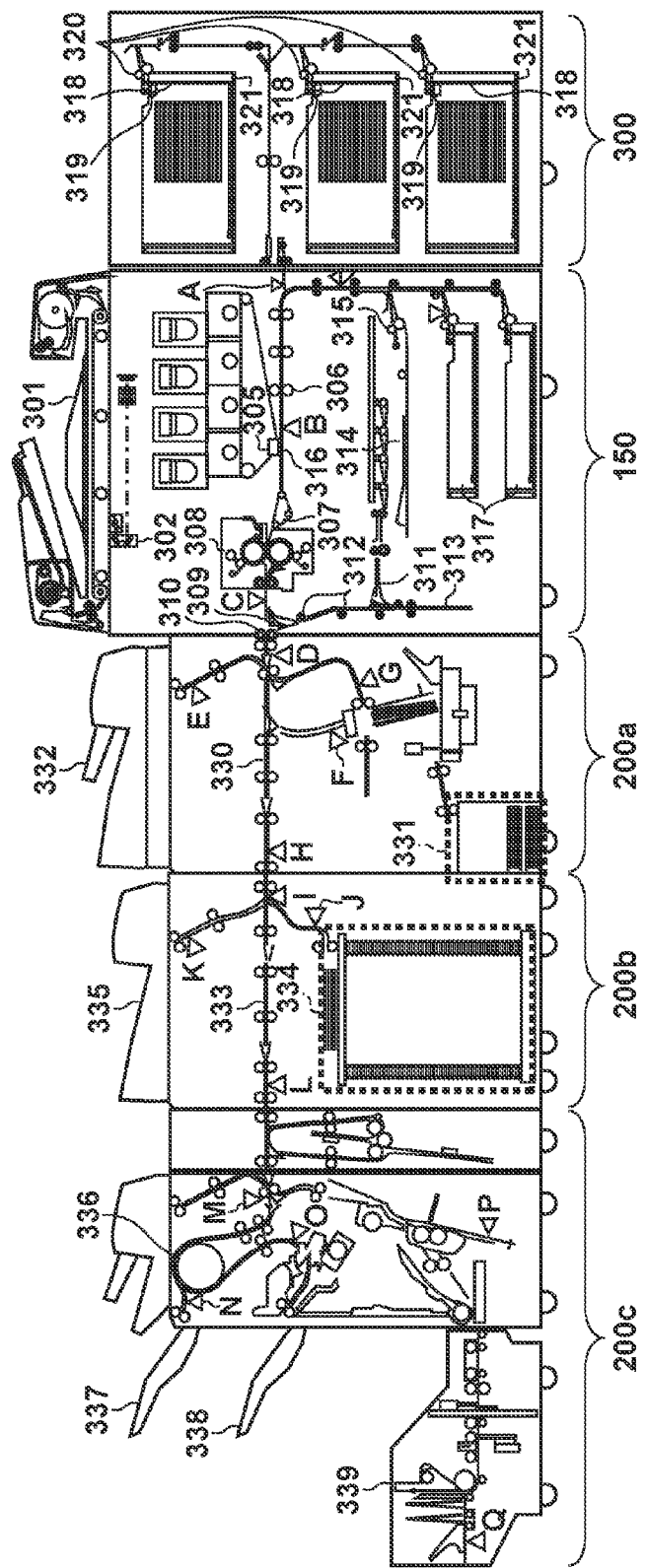
FIG. 3 is a cross-sectional view of a printing apparatus 150, and sheet processing apparatuses 200 and a sheet feeding apparatus 300 that are connected to the printing apparatus 150 in the printing system 100.

Next, FIG. 3 is a cross-sectional view of the printing apparatus 150, and the sheet processing apparatuses 200 and the sheet feeding apparatus 300 that are connected to the printing apparatus 150 in the printing system 100. The printing system 100 includes, as the sheet processing apparatuses 200, a glue bookbinding apparatus 200a, a large capacity stacker 200b and a saddle stitching apparatus 200c. Hereinafter, an example of a configuration of the printing system 100 will be described by describing, as an example, operations performed by the printing system 100 to execute a copy job.

An automatic document feeder (ADF) 301 provided in the scanner unit 201 sequentially separates one by one a plurality of pages of an original set in an original tray by the user from the topmost page so as to convey each separated page onto a glass platen. A reading unit 302 reads an image of the page of the original conveyed onto the glass platen with the use of a CCD, and converts the image of the original to image data. The image data obtained by the conversion is stored in a memory such as the RAM 208, the HDD 209 or the like by the control unit 205.

The printing apparatus 150 is a tandem-type color printer including a plurality of photosensitive members (photosensitive drums), and includes sheet feeding cassettes 317 as built-in sheet feeding units. In addition, as described above, the printing apparatus 150 is also connected to the sheet feeding apparatus 300 capable of housing a large number of sheets as a sheet feeding unit. The sheet feeding cassettes 317 and the sheet feeding apparatus 300 function as sheet feeding units that feed sheets to the printing apparatus 150.

Here, the sheet feeding apparatus 300 includes blowers 319 that separate, one by one, the sheets housed in sheet feeding decks 318, sheet feeding rollers 320 that feed the separated sheets, and sheet feeding lifters 321 that adjust the height of sheets of paper to an appropriate position. The sheet feeding apparatus 300 adjusts the internal temperature of the sheet feeding apparatus 300 by using a heater (not shown) and the blowers 319 that send air heated by the heater to the inside of the sheet feeding decks 318. The temperature adjustment control differs depending on the type of sheets that are fed. For example, in the case of feeding sheets of plain paper having a basis weight of about 64 $g/m^2$ to 105 $g/m^2$, the temperature control is not performed. On the other hand, in the case of feeding sheets of thick paper having a basis weight exceeding 105 $g/m^2$, the temperature control is performed. If the heater temperature does not reach a predetermined temperature, the sheet feeding apparatus 300 cannot start conveying sheets, and thus starts conveying sheets after the heater temperature has reached the predetermined temperature. Also, the sheet feeding decks 318 blow air to the sheets set in the sheet feeding decks 318 so as to convey the sheets sequentially from the topmost sheet separated from the sheets in the sheet feeding decks 318.

The printing apparatus 150 conveys a sheet fed from any one of the sheet feeding units to a position where registration rollers 306 are provided, and temporarily stops the conveyance of the sheet so as to synchronize with an intermediate transfer belt 305. During the time when the sheet before being subjected to transfer is located at the position where the registration rollers 306 are provided, a sheet to be used to print the next page can be fed from any one of the sheet feeding cassettes 317 or the sheet feeding decks 318 provided in the sheet feeding apparatus 300. In this way, by feeding a sheet to be used to print the next page during execution of printing of the first page, it is possible to shorten the conveyance interval of a plurality of sheets and enhance print productivity.

The image data temporarily stored in the RAM 208 or the HDD 209 is transferred to the printer unit 203 and converted into laser light of four colors of yellow (Y), magenta (M), cyan (C) and black (K) by a laser recording unit (not shown). The laser light of each color is applied to the corresponding photosensitive member, and an electrostatic latent image of the corresponding color is formed on the photosensitive member. Furthermore, each electrostatic latent image is developed by toner of the corresponding color supplied from a toner cartridge, and a toner image is thereby formed on the photosensitive member. The toner image formed on the photosensitive member is then subjected to primary transfer on the intermediate transfer belt 305.

The intermediate transfer belt 305 rotates clockwise in FIG. 3 at a constant speed. When the toner image on the belt reaches a predetermined position by rotation of the intermediate transfer belt 305, conveyance of the sheet held at the position of the registration rollers 306 starts. As used herein, the predetermined position refers to a position at which when the leading edge in the conveyance direction of the toner image transferred onto the intermediate transfer belt 305 reaches a secondary transfer position 316, the leading edge of the sheet conveyed from the position of the registration rollers 306 can arrive at the secondary transfer position 316. In this way, at the secondary transfer position 316, the toner image on the intermediate transfer belt 305 is transferred onto the sheet. The sheet onto which the toner image has been transferred is conveyed to a fixing unit 308 by a belt 307. The toner is fixed to the sheet by application of pressure and heat by the fixing unit 308. The sheet after the fixing by the fixing unit 308 is conveyed through a sheet conveyance path, and then discharged from the printing apparatus 150.

A discharge flapper 309 is configured to be capable of swinging about a swing shaft, and defines a sheet conveyance direction. The discharge flapper 309 swings clockwise in FIG. 3, and is fixed at that position. As a result, the sheet discharged from the fixing unit 308 is conveyed in a direction of discharge rollers 310. After that, the sheet is conveyed into the glue bookbinding apparatus 200a, which is one of the sheet processing apparatuses 200, by the discharge rollers 310. In this way, single-sided printing is executed on the sheet.

On the other hand, in the case of executing double-sided printing on a sheet, the discharge flapper 309 swings counterclockwise in FIG. 3, and is fixed at that position. As a result, the sheet discharged from the fixing unit 308 is conveyed downward and sent to a sheet reverse conveyance unit. The sheet reverse conveyance unit includes a reverse flapper 311, conveyance rollers 312, a reverse guide 313 and a sheet reverse tray 314. The reverse flapper 311 swings about a swing shaft, and defines a sheet conveyance direction. In the case of double-sided printing, the control unit 205 performs control so as to cause the reverse flapper 311 to swing counterclockwise in FIG. 3 to send the sheet having an image printed on a first surface thereof to the reverse guide 313 via the conveyance rollers 312. After that, the control unit 205 temporarily stops reverse rollers that are provided at an entrance of the reverse guide, with the trailing edge of the sheet being sandwiched by the reverse rollers, and subsequently causes the reverse flapper 311 to swing clockwise in FIG. 3 so as to rotate the reverse rollers in an opposite direction. By doing so, the control unit 205 performs control so as to switch back the sheet sandwiched by the reverse rollers and introduce the sheet whose trailing and leading edges are reversed into the sheet reverse tray 314.

The sheet introduced into the sheet reverse tray 314 is temporarily stored in the sheet reverse tray 314, and then again conveyed in a direction of the registration rollers 306 by sheet re-feeding rollers 315. At this time, a second surface of the sheet, which is opposite to the first surface on which toner has been transferred through the transfer process, is positioned in facing relationship with the intermediate transfer belt 305. After that, in the same manner as the aforementioned transfer process performed on the first surface of the sheet, a transfer process is performed on the second surface of the sheet, and a toner image (image) is thereby formed on the second surface of the sheet. Furthermore, the toner image (image) formed on the second surface of the sheet is fixed to the sheet by the fixing unit 308. The sheet after the fixing by the fixing unit 308 is conveyed into the glue bookbinding apparatus 200a by the discharge rollers 310. Double-sided printing is executed in this way.

The sheet having an image printed on one side or both sides thereof by the printing apparatus 150 is conveyed to any one of the glue bookbinding apparatus 200a, the large capacity stacker 200b and the saddle stitching apparatus 200c according to the post-processing settings included in the copy job issued via the operation unit 204.

In the case where the copy job includes a setting to execute glue bookbinding processing as a post-processing setting, a sheet having an image printed by the printing apparatus 150 is conveyed to the glue bookbinding apparatus 200a, where bookbinding processing is executed. Printed products (bookbinding products) obtained through bookbinding processing are stacked in a bookbinding product discharge unit 331. The glue bookbinding apparatus 200a executes bookbinding processing by wrapping a plurality of sheets having an image printed by the printing apparatus 150 with a sheet fed from an inserter 332 as required.

In the case where the copy job includes a setting to execute processing for stacking a large number of sheets as a post-processing setting, a sheet having an image printed by the printing apparatus 150 is conveyed to the large capacity stacker 200b via a sheet conveyance path 330 provided in the glue bookbinding apparatus 200a. The large capacity stacker 200b discharges the sheet received via the sheet conveyance path 330 to an escape tray 335 or a stacking unit 334 so as to stack the sheet in the escape tray 335 or the stacking unit 334.

In the case where the copy job does not include a post-processing setting, a sheet having an image printed by the printing apparatus 150 is conveyed to the saddle stitching apparatus 200c via the sheet conveyance path 330 provided in the glue bookbinding apparatus 200a and a sheet conveyance path 333 provided in the large capacity stacker 200b. The saddle stitching apparatus 200c discharges the received sheet to a sheet discharge unit 337 via a sheet conveyance path 336.

In the case where the copy job includes a setting to execute staple processing as a post-processing setting, the saddle stitching apparatus 200c stacks the received sheet in an intermediate tray via the sheet conveyance path 336. After that, when one bundle of sheets that need to be stapled are stacked in the intermediate tray, the saddle stitching apparatus 200c staples the one bundle of sheets and discharges the stapled bundle of sheets to a sheet discharge unit 338. In the case where the copy job includes a setting to execute saddle stitching processing as a post-processing setting, the saddle stitching apparatus 200c executes saddle stitching processing on the received sheets, and discharges the obtained bookbinding product (printed product) to a sheet discharge unit 339.

In the printing system 100, sheet detection sensors A to Q are provided to the sheet conveyance paths respectively provided in the printing apparatus 150, the glue bookbinding apparatus 200a, the large capacity stacker 200b and the saddle stitching apparatus 200c. As shown in FIG. 3, the sheet detection sensors A to Q are provided on the sheet conveyance paths at the entrance and exit of each apparatus, a branch, a junction and the like. The control unit 205 receives signals from the sheet detection sensors A to Q so as to identify whether or not there is a sheet conveyed via the sheet conveyance paths as well as the position of the sheet.

For example, if a signal from a specific sheet detection sensor is continuously transmitted for a predetermined period of time, the control unit 205 determines that a sheet stuck jam (paper jam) has occurred at a position corresponding to the specific sheet detection sensor. If no signal is received from the subsequent sheet detection sensor for a predetermined period of time after a sheet has passed through the position of the specific sheet detection sensor, the control unit 205 determines that a sheet delivery delay jam (paper jam) has occurred somewhere between the sheet detection sensors.

If a sheet jam (paper jam) occurs in a sheet conveyance path in the printing system 100, the control unit 205 interrupts printing, and displays the position of the sheets that need to be removed and a procedure for removing the sheets on the operation unit 204 as a guidance, in accordance with the signal from the sheet detection sensor. This enables the user to be aware of the position in the printing system 100 of the sheets that need to be removed and to remove the sheets from the sheet conveyance path in accordance with the guidance. If an instruction to restart printing is issued by the user via the operation unit 204 after all of the sheets have been removed from the sheet conveyance path, the control unit 205 restarts printing.

In the present embodiment, a case has been described in which the printing apparatus 150 is a 4D (drum) type color MFP, but the configuration of the printing apparatus 150 is not limited thereto, and it is also possible to use a monochrome MFP or a 1D (drum) type color MFP. Also, in the above description, the operations and configuration of the printing system 100 are described taking a copy job as an example, but in the case of a print job, the printing system 100 performs the same operations except for some operations. To be specific, the printing system 100 may execute a print operation by using, instead of the image data generated by the scanner unit 201, print data (image data) received from an external apparatus via the external I/F 202.

Configuration of Operation Unit 204

Figure 4:
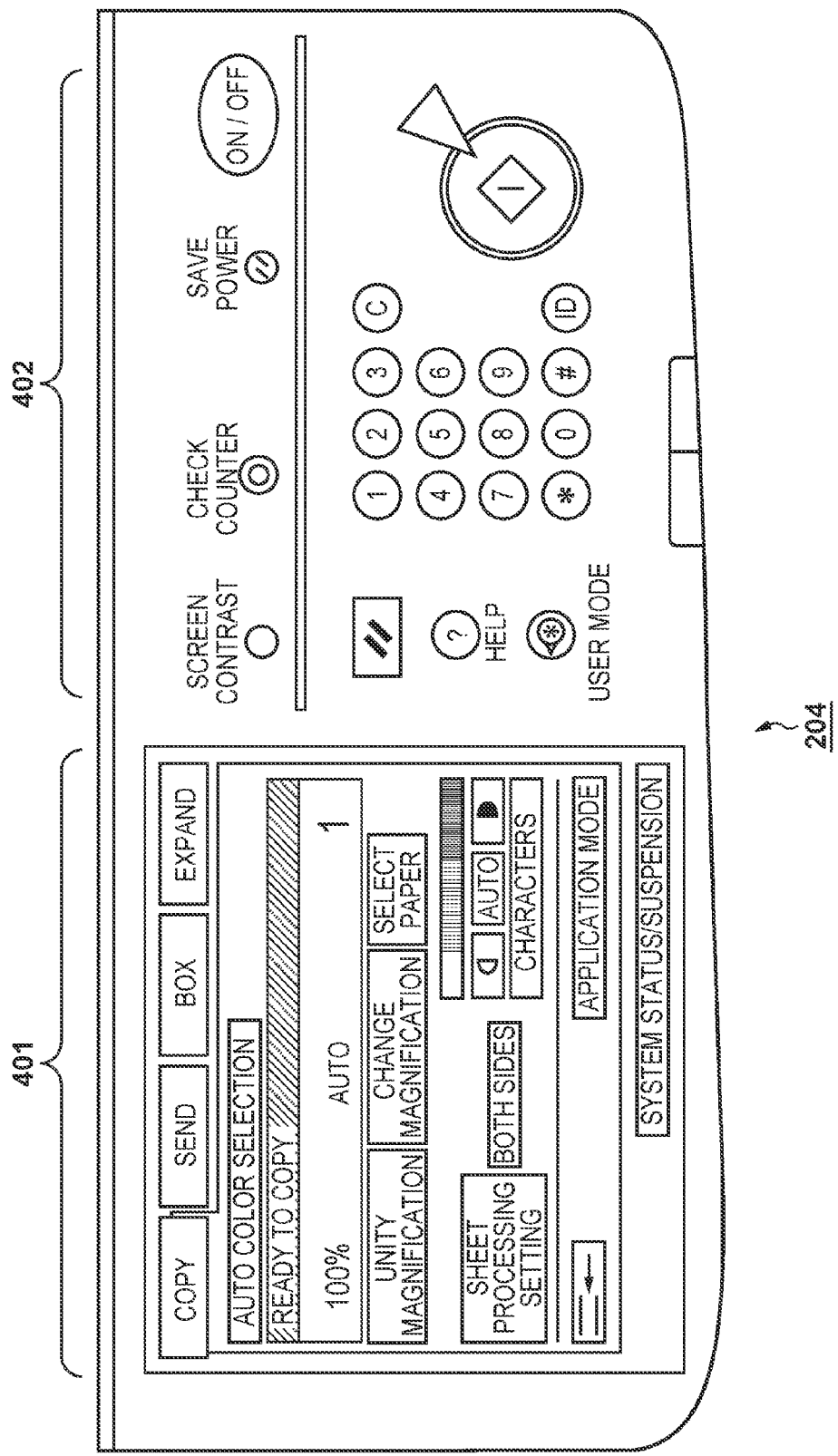
FIG. 4 is a diagram showing an example of a configuration of an operation unit 204.

FIG. 4 is a diagram showing an example of a configuration of the operation unit 204. The operation unit 204 includes a liquid crystal display unit (touch panel unit) 401 and a key input unit 402, and is configured to accept an instruction from the user via these units. Also, the operation unit 204 displays various screens on the touch panel unit 401. In this way, the operation unit 204 functions as a user interface (UI) of the printing system 100 (the printing apparatus 150). The touch panel unit 401 includes a liquid crystal display unit (LCD) and a touch panel attached onto the liquid crystal display unit. The touch panel unit 401 is capable of accepting user operations via displayed soft keys (display keys). On the other hand, the key input unit 402 is capable of accepting user operations via hard keys.

First Embodiment

Processing according to a first embodiment of the present invention executed by the printing system 100 shown in FIGS. 1 to 4 will be described next. In the present embodiment, if the printing system 100 (the printing apparatus 150) accepts, during execution of a job, a specific interruption instruction indicating that the execution of the job should be interrupted, the printing system 100 interrupts the execution of the job. If a preparation operation for executing the job is in progress at the time of interruption of the job, the printing system 100 controls devices that are performing the preparation operation so as to continue the preparation operation without interrupting the preparation operation. The specific interruption instruction is, for example, an instruction for accepting, from the user, a setting change for changing the settings of the job that is being executed. By doing so, when restarting the execution of the job after interruption of the execution of the job, the preparation operation has been performed, and therefore the execution of the job can be quickly restarted.

Hereinafter, specific examples of operations of the printing system 100 for implementing the above-described processing according to the present embodiment with the printing system 100 will be described with reference to FIGS. 5 to 10. FIGS. 5 to 8 are flowcharts illustrating procedures of processing executed by the control unit 205 (CPU). The processing of each step shown in FIGS. 5 to 8 is implemented in the printing system 100 by the control unit 205 reading a control program stored in the ROM 207 or the HDD 209 into the RAM 208 and executing the control program. The processing procedures according to the flowcharts shown in FIGS. 5 to 8 may be executed in sequence in the printing system 100, or two or more processing procedures may be executed in parallel. Also, in the present embodiment, an example will be described in which the job executed by the printing system 100 is a print job, but the present embodiment is also applicable to any other type of job (for example, a copy job or the like).

Processing when Print Job is Received

Figure 5:
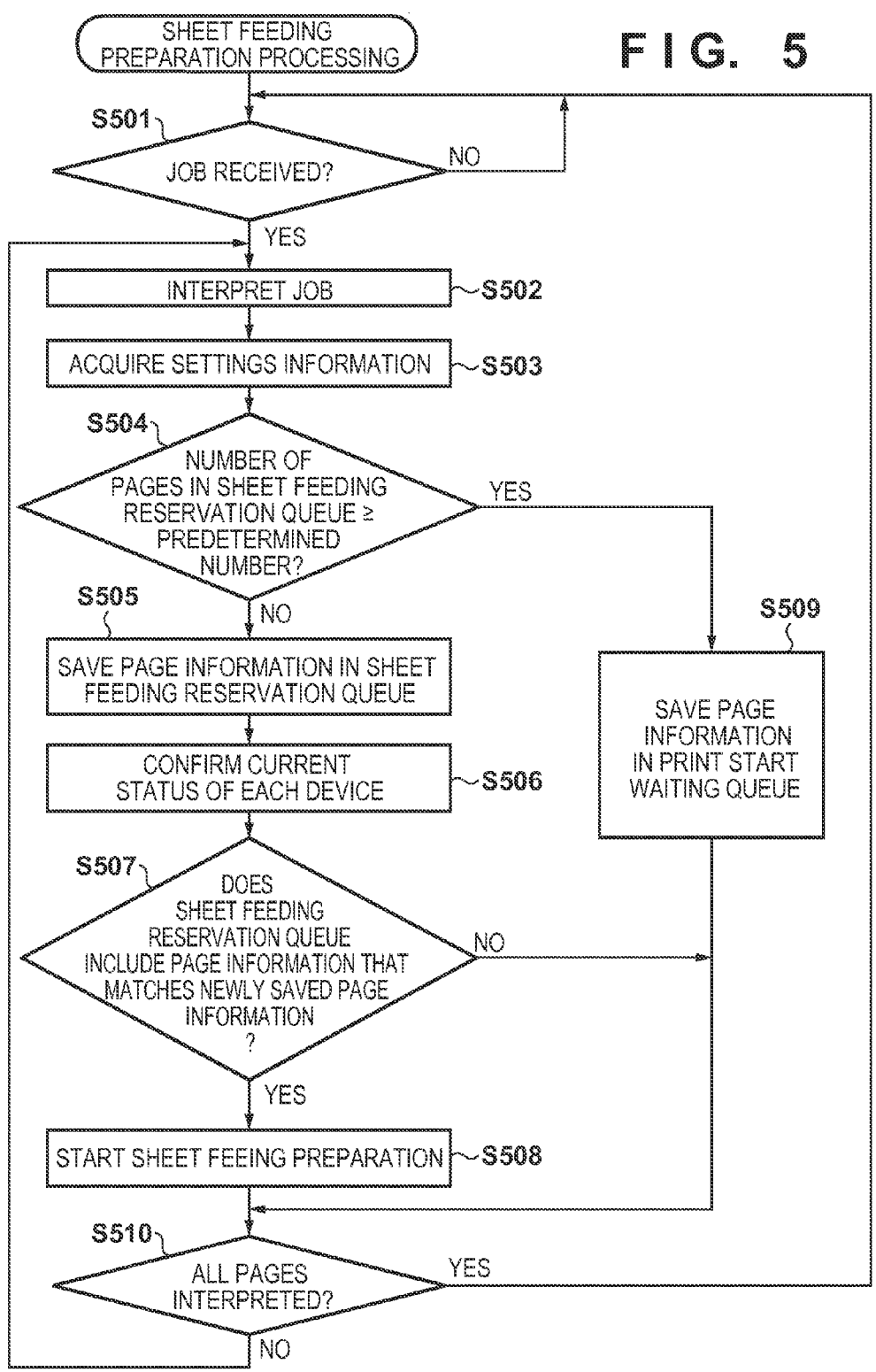
FIG. 5 is a flowchart illustrating a procedure of processing executed when a print job is received by the printing system 100 according to first and second embodiments.

First, control executed when a print job is received by the printing system 100 will be described with reference to FIG. 5. In step S501, the control unit 205 determines whether or not a print job that needs to be executed has been received. If it is determined that a print job has been received, the control unit 205 advances the processing to step S502. In step S502 and subsequent steps, the control unit 205 performs preparation operations for executing the print job with respect to the devices that are used to execute the print job, and further starts execution of the print job. For example, the control unit 205 starts a sheet feeding preparation operation in a sheet feeding unit that feeds sheets (any one of the sheet feeding cassettes 317 and the sheet feeding decks 318). Also, the control unit 205 starts a preparation operation for executing post-processing in a post-processing apparatus (any one of the glue bookbinding apparatus 200a, the large capacity stacker 200b and the saddle stitching apparatus 200c) that executes post-processing on the sheets that have undergone print processing by the printing apparatus 150. In the present embodiment, these post-processing apparatuses function as sheet discharge units of the printing apparatus 150.

To be specific, in step S502, the control unit 205 starts interpretation of the received print job, and executes interpretation of the settings of each page included in the print job. Furthermore, in step S503, the control unit 205 acquires, as settings information, device information regarding the devices that are used to process pages that have been interpreted such as the sheet feeding unit, the sheet discharge unit and the printing apparatus 150, and sheet information regarding the sheets used to process the pages. In the present embodiment, the sheet feeding unit corresponds to, for example, any one of the sheet feeding cassettes 317 and the sheet feeding decks 318, and the sheet discharge unit corresponds to any one of the glue bookbinding apparatus 200*a*, the large capacity stacker 200*b* and the saddle stitching apparatus 200*c* that are sheet processing apparatuses 200. The large capacity stacker 200*b* is an example of a stacking apparatus in which the printed sheets conveyed from the printing apparatus 150 are stacked.

Next, in step S504, the control unit 205 confirms a sheet feeding reservation queue provided in the RAM 208. Information (page information) regarding (reserved) pages waiting for sheets of print paper to be fed is saved in the sheet feeding reservation queue. The page information includes the settings information acquired in step S503. The control unit 205 determines whether or not the number of pages whose page information is saved in the sheet feeding reservation queue is greater than or equal to a predetermined number. If it is determined that the number of pages is less than the predetermined number, the control unit 205 advances the processing to step S505. If it is determined that the number of pages is greater than or equal to the predetermined number, the control unit 205 advances the processing to step S509. The number of pages (predetermined number) used for comparison in step S504 is determined in advance based on the print processing speed of the printing apparatus 150, the storage capacity of the RAM 208, and the time required to perform a preparation operation in the sheet feeding unit and the sheet discharge unit.

For example, a case is given in which the print processing speed of the printing apparatus 150 is 80 ppm, and the time required for temperature adjustment, which is a preparation operation (sheet feeding preparation) for the sheet feeding apparatus 300 (the sheet feeding deck 318) to feed sheets, is 15 seconds. In this case, if the sheet feeding preparation of the sheet feeding apparatus 300 starts during execution of print processing, it is possible to execute print processing on 20 sheets (in 15 seconds at 80 ppm) during the period from the start of the sheet feeding preparation to the completion of the sheet feeding preparation. Accordingly, it is sufficient if at least 20 sheets are reserved for sheet feeding. By doing so, even if a setting is made to change the sheet feeding unit in use during execution of print processing, it is unnecessary to interrupt the print processing due to the change of the sheet feeding unit, and thus continuous print processing is possible. In the case of executing, for example, a print job that uses different sheet feeding units between when the 1st to 20th pages are printed and when the 21st page is printed, a sheet feeding reservation is made with respect to the 20th page, and the sheet feeding preparation starts after feeding of a sheet for the 1st page is started. As a result, when print processing is executed for the 21st page (or in other words, after 15 seconds), the sheet feeding preparation for the sheet used to print the 21st page is completed. Accordingly, in this case, the predetermined number may be set to 20.

Also, another case is given in which, for example, the glue bookbinding apparatus 200*a* is used as a post-processing apparatus that performs post-processing on sheets, and the time required to perform a preparation operation (glue melting processing) for executing the post-processing is 1 minute. In this case, the time required for the preparation of the glue bookbinding apparatus 200*a* is longer than the time required for the sheet feeding preparation of the sheet feeding apparatus 300, and thus the number of sheets that need to be reserved for sheet feeding may be determined according to the time required for the preparation of the glue bookbinding apparatus 200*a*. To be specific, if the printing apparatus 150 has a print processing speed of 80 ppm, it is sufficient if at least 80 sheets (in 60 seconds) are reserved for sheet feeding. Accordingly, if the preparation of the glue bookbinding apparatus 200*a* is started together with the sheet feeding reservation, it is unnecessary to interrupt print processing due to the sheet feeding preparation and the preparation of the glue bookbinding apparatus 200*a*, and thus continuous print processing is possible. Thus, in this case, the predetermined number may be set to 80.

If the processing proceeds from step S504 to step S509, the control unit 205 saves the page information of the pages to be processed (including the settings information acquired in step S503) in a print start waiting queue provided in the HDD 209, and then advances the processing to step S510.

If, on the other hand, the processing proceeds from S504 to S505, where the control unit 205 saves the page information of the pages to be processed (including the settings information acquired in step S503) in the sheet feeding reservation queue. After that, in S506, the control unit 205 confirms the current status of each device (the sheet feeding unit, the sheet discharge unit and the printing apparatus 150) and advances the processing to step S507.

In step S507, the control unit 205 determines whether or not there is page information that matches the page information (settings information) newly saved in the sheet feeding reservation queue in the page information (settings information) that is already saved in the sheet feeding reservation queue. If it is determined that there is such page information, the control unit 205 advances the processing to step S508. If it is determined that there is no such page information, the control unit 205 advances the processing to step S510. In step S508, the control unit 205 starts a sheet feeding preparation operation for the devices (the sheet feeding unit, the sheet discharge unit and the printing apparatus 150) that are used to process the pages corresponding to the page information, based on the page information newly saved in the sheet feeding reservation queue, and advances the processing to step S510.

In step S510, the control unit 205 determines whether or not interpretation on all pages included in the print job received in step S501 have been completed. If it is determined that interpretation on all pages have not been completed, the control unit 205 returns the processing to step S502, and continues to perform interpretation on the remaining pages. If, on the other hand, it is determined that interpretation on all pages have been completed, the control unit 205 returns the processing to S501, and waits for a new print job to be received.

Sheet Feeding Processing

Figure 6:
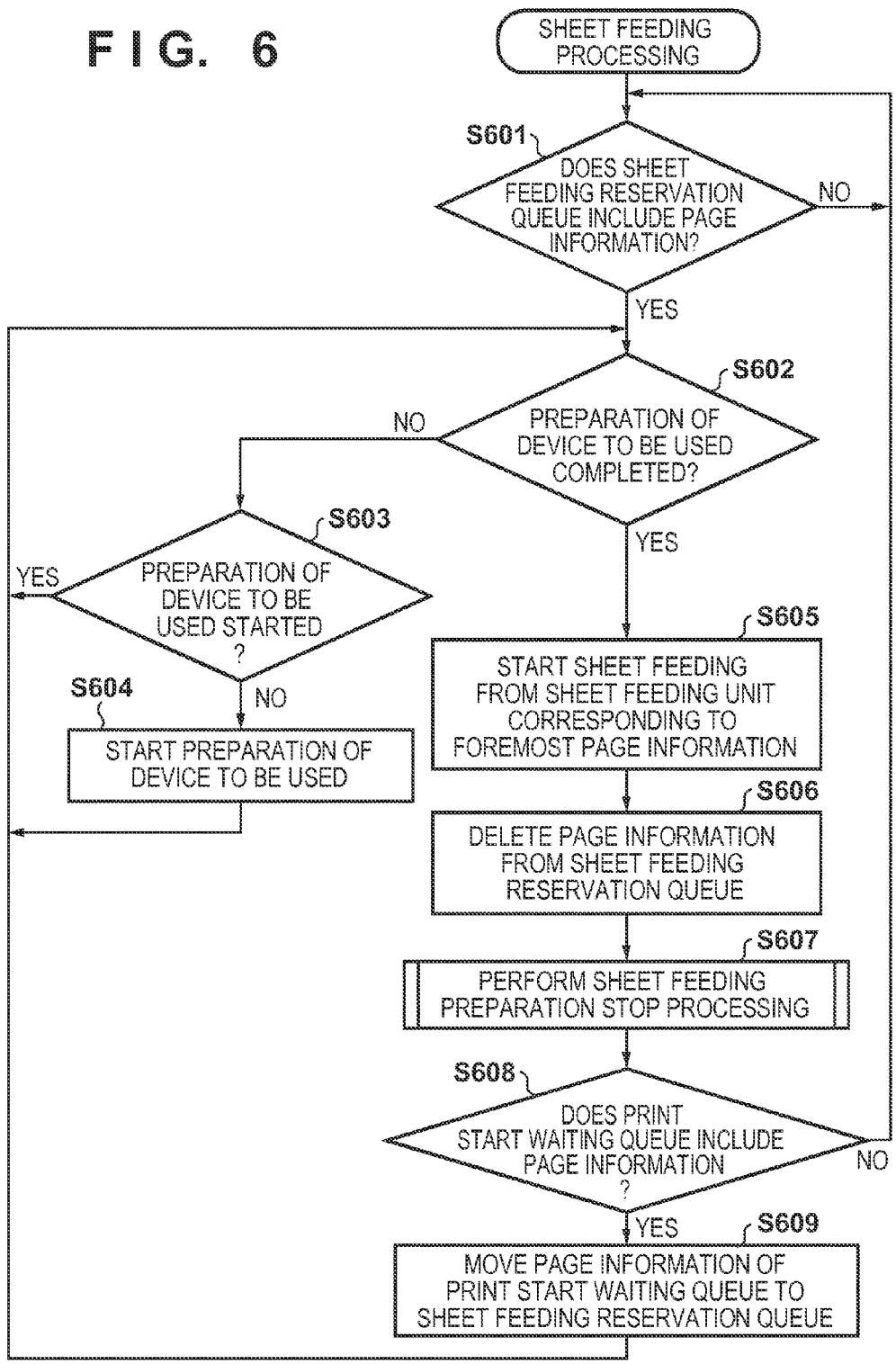
FIG. 6 is a flowchart illustrating a procedure of sheet feeding processing executed by the printing system 100 according to the first and second embodiments.

A procedure of sheet feeding processing executed by the printing system 100 will be described next with reference to FIG. 6. As described above, the processing procedure shown in FIG. 6 can be executed in parallel to the processing procedure shown in FIG. 5.

First, in step S601, the control unit 205 determines whether or not there is a page waiting for a sheet to be fed, by determining whether or not there is page information in the sheet feeding reservation queue provided in the RAM 208. If it is determined that there is no page information in the sheet feeding reservation queue, the control unit 205 repeats the determining processing in step S601. If it is determined that there is page information in the sheet feeding reservation queue, the control unit 205 advances the processing to step S602.

In step S602, the control unit 205 confirms the status of each device (the sheet feeding unit, the sheet discharge unit and the printing apparatus 150) to be used to process a page corresponding to the foremost page information in the sheet feeding reservation queue, and determines whether or not each device has completed the sheet feeding preparation. If it is determined that all devices to be used have completed the sheet feeding preparation, the control unit 205 advances the processing to step S605. If it is determined that at least one of the devices to be used has not completed the sheet feeding preparation, the control unit 205 advances the processing to step S603.

In step S603, the control unit 205 determines whether or not the preparation operation of each device (the sheet feeding unit, the sheet discharge unit and the printing apparatus 150) corresponding to the foremost page information (settings information) in the sheet feeding reservation queue has been started. If it is determined that the preparation operations of the devices have not been started, the control unit 205 advances the processing to step S604. If it is determined that the preparation operations of all devices that are to be used have been started, the control unit 205 returns the processing to step S602, and waits for the preparation operations to be completed. In step S604, the control unit 205 starts the preparation operations of the devices corresponding to the foremost page information (settings information) in the sheet feeding reservation queue, returns the processing to step S602, and waits for the preparation operations to be completed.

If the processing proceeds from step S602 to step S605, the control unit 205 starts sheet feeding from the sheet feeding unit corresponding to the foremost page information (settings information) in the sheet feeding reservation queue, and advances the processing to step S606. In step S606, the control unit 205 deletes, from the sheet feeding reservation queue, the page information corresponding to the sheets which has been started to be fed from the sheet feeding unit, and advances the processing to step S607.

In step S607, the control unit 205 executes processing (sheet feeding preparation stop processing) for stopping the sheet feeding preparation operation (according to a procedure described later with reference to FIG. 8). After that, in step S608, the control unit 205 confirms the print start waiting queue, and determines whether or not there is page information in the print start waiting queue (or in other words, whether or not there is a page waiting for a sheet feeding reservation to be performed). If it is determined that there is no page information in the print start waiting queue, the control unit 205 returns the processing to step S601. If it is determined that there is page information in the print start waiting queue, the control unit 205 advances the processing to step S609. In step S609, the control unit 205 moves the foremost page information in the print start waiting queue to the sheet feeding reservation queue. After that, the control unit 205 returns the processing to step S602, and continues to perform the sheet feeding preparation operation.

Sheet Feeding Preparation Stop Processing

The sheet feeding preparation stop processing executed by the printing system 100 will be described next with reference to FIG. 7. First, in step S701, the control unit 205 confirms the current status of each device (the sheet feeding unit, the sheet discharge unit and the printing apparatus 150). Next, in step S702, the control unit 205 acquires the page information in the sheet feeding reservation queue, and advances the processing to step S703.

In step S703, the control unit 205 determines whether or not the device (the sheet feeding unit, the sheet discharge unit and the printing apparatus 150) that does not correspond to the page information present in the sheet feeding reservation queue (or in other words, a device that is not to be used) is performing a sheet feeding preparation operation. If it is determined that the sheet feeding unit that is not to be used is not performing the sheet feeding preparation operation, the control unit 205 ends the processing. If it is determined that the sheet feeding unit that is not to be used is performing the preparation operation (or in other words, the preparation operation is being continued), the control unit 205 advances the processing to step S704.

In step S704, the control unit 205 confirms a temporary interruption flag stored in the RAM 208, and determines whether or not the temporary interruption flag is set to ON. If it is determined that the temporary interruption flag is set to ON, the control unit 205 ends the processing. If it is determined that the temporary interruption flag is not set to ON (or in other words, set to OFF), the control unit 205 advances the processing to step S705. In step S705, the control unit 205 stops the preparation operation performed in the device (the sheet feeding unit, the sheet discharge unit and the printing apparatus 150) which is performing the preparation operation, and ends the processing.

Here, as will be described later with reference to FIG. 8, the control unit 205 interrupts execution of the print job that is being executed upon accepting an interruption instruction for making a change in the settings. At this time, the temporary interruption flag is set to ON (step S802 in FIG. 8). As a result, at the time when the print job is interrupted, if the preparation operation of the device used in the print job is being executed in step S703 (Yes in step S703), the control unit 205 controls the device so as to continue the preparation operation without interrupting the preparation operation. In other words, the control unit 205 continues the preparation operation of the device that is no longer used in the print job as a result of the print job being interrupted, without interrupting the preparation operation (Yes in step S704).

Setting Change Processing

Figure 8:
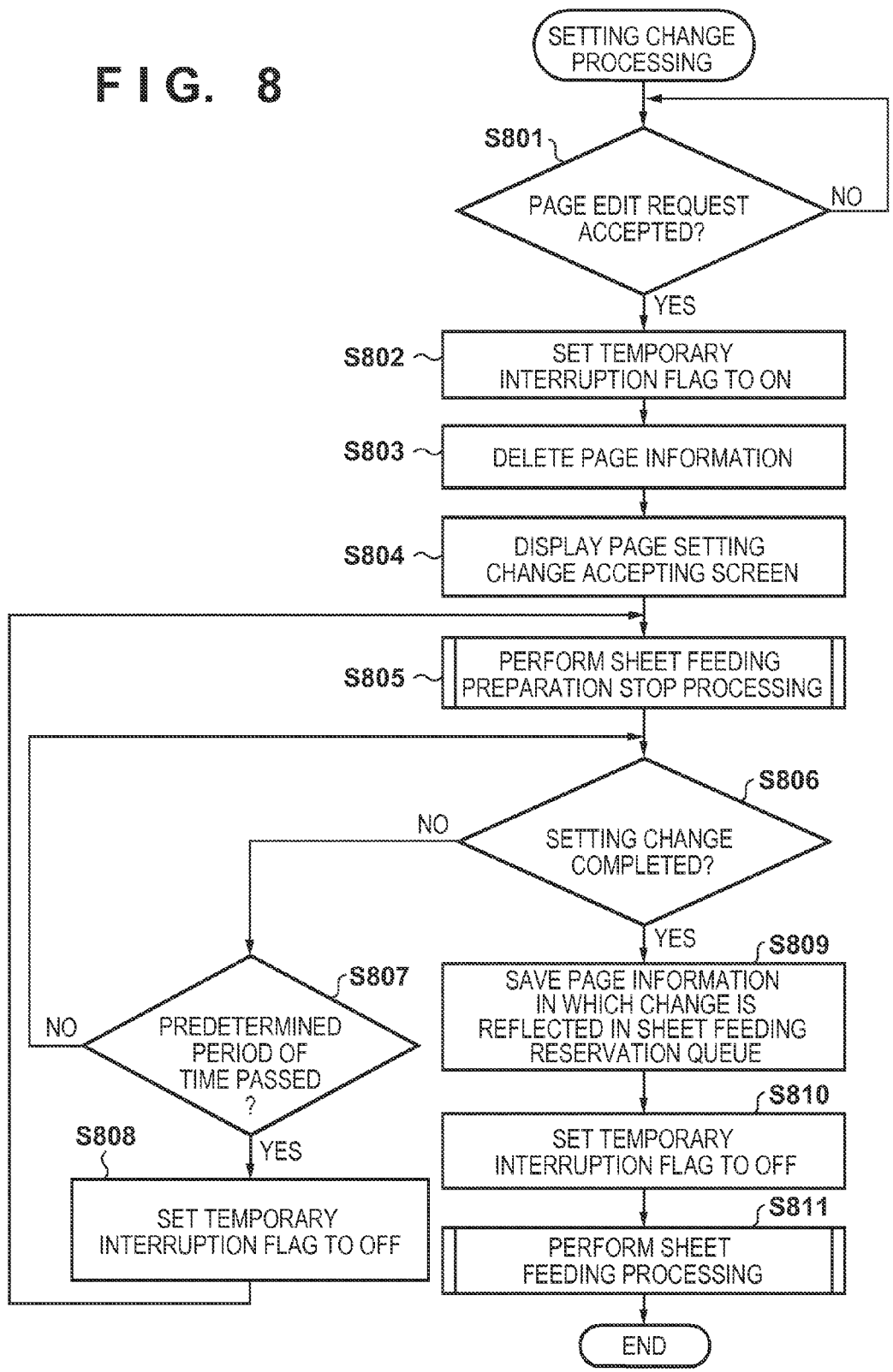
FIG. 8 is a flowchart illustrating a procedure of processing executed by the printing system 100 when a change is made to the settings of a print job that is being executed according to the first and second embodiments.

Next is a description of control executed by the printing system 100 when a change is made to the settings of the print job that is being executed with reference to FIG. 8. In the present embodiment, a case will be described in which, as an example of a print job setting change, a page edit request for editing a page included in the print job is accepted.

Figure 9:
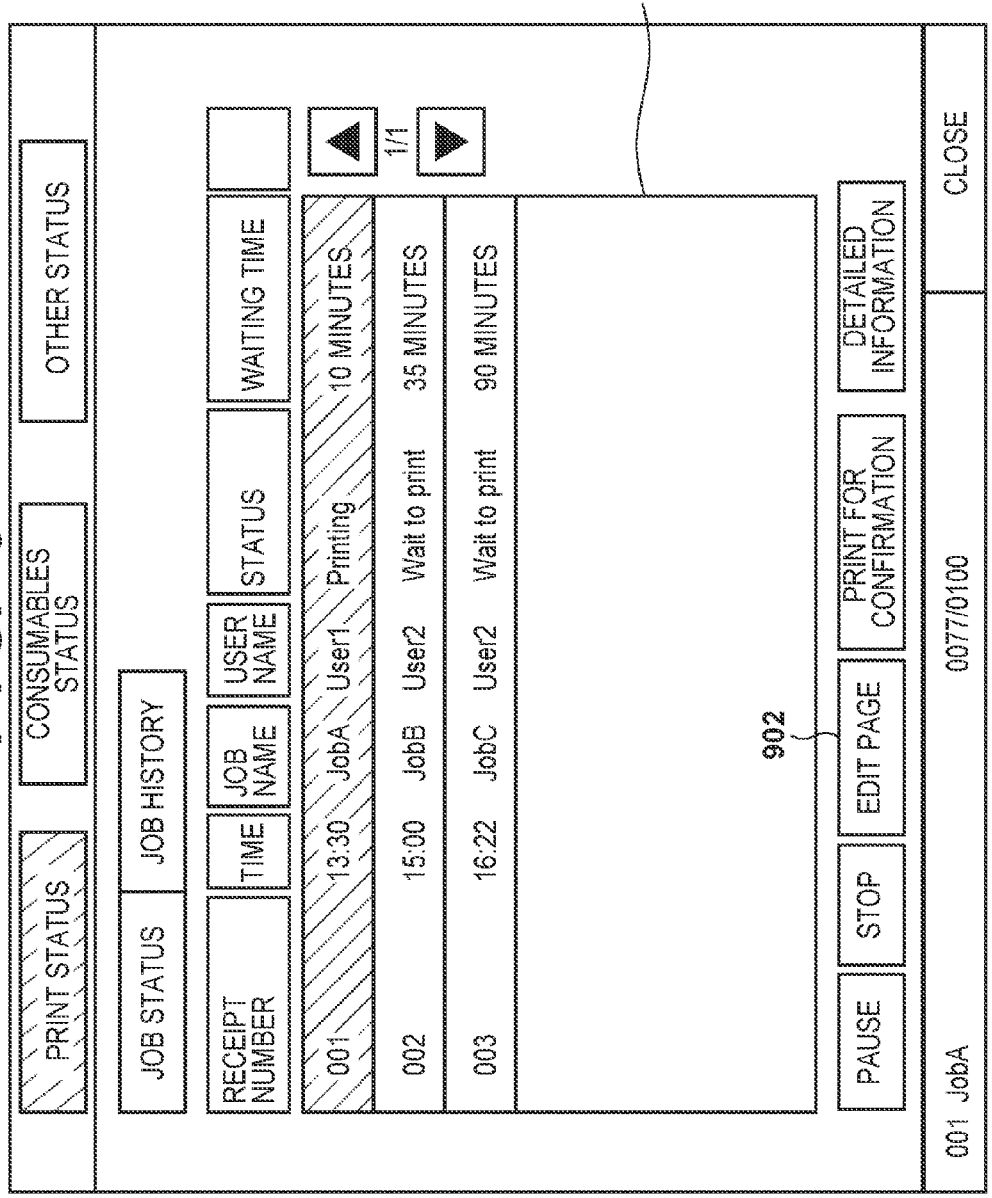
FIG. 9 is a diagram showing an example of a job status screen.

In step S801, the control unit 205 determines whether or not a page edit request has been accepted from the user via the operation unit 204. Here, FIG. 9 shows an example of a job status screen displayed on the touch panel unit 401 as a result of a job status screen display button ("system status/suspension" button) of the operation unit 204 being pressed by the user. As shown in FIG. 9, the control unit 205 displays a list of received jobs in a job list display area 901, and performs display control such that the user can select any one of the received jobs. If the control unit 205 detects that a page edit button 902 has been pressed by the user on the job status screen 900, the control unit 205 determines that a page edit request has been accepted from the user, and advances the processing to step S802. In the present embodiment, the page edit request is an example of the aforementioned specific interruption instruction, and corresponds to an instruction to accept, from the user, a change in the settings of the print job that is being executed, after execution of the print job is started.

In step S802, the control unit 205 sets the temporary interruption flag stored in the RAM 208 to ON, the temporary interruption flag indicating that execution of the job is interrupted by the printing system 100, and advances the processing to step S803. In step S803, the control unit 205 identifies page information corresponding to the job for which the page edit request has been accepted from among the page information in the sheet feeding reservation queue stored in the RAM 208. Furthermore, the control unit 205 deletes, from the sheet feeding reservation queue, the identified page information corresponding to the job for which the page edit request has been accepted and page information corresponding to the subsequent pages.

Figure 10:
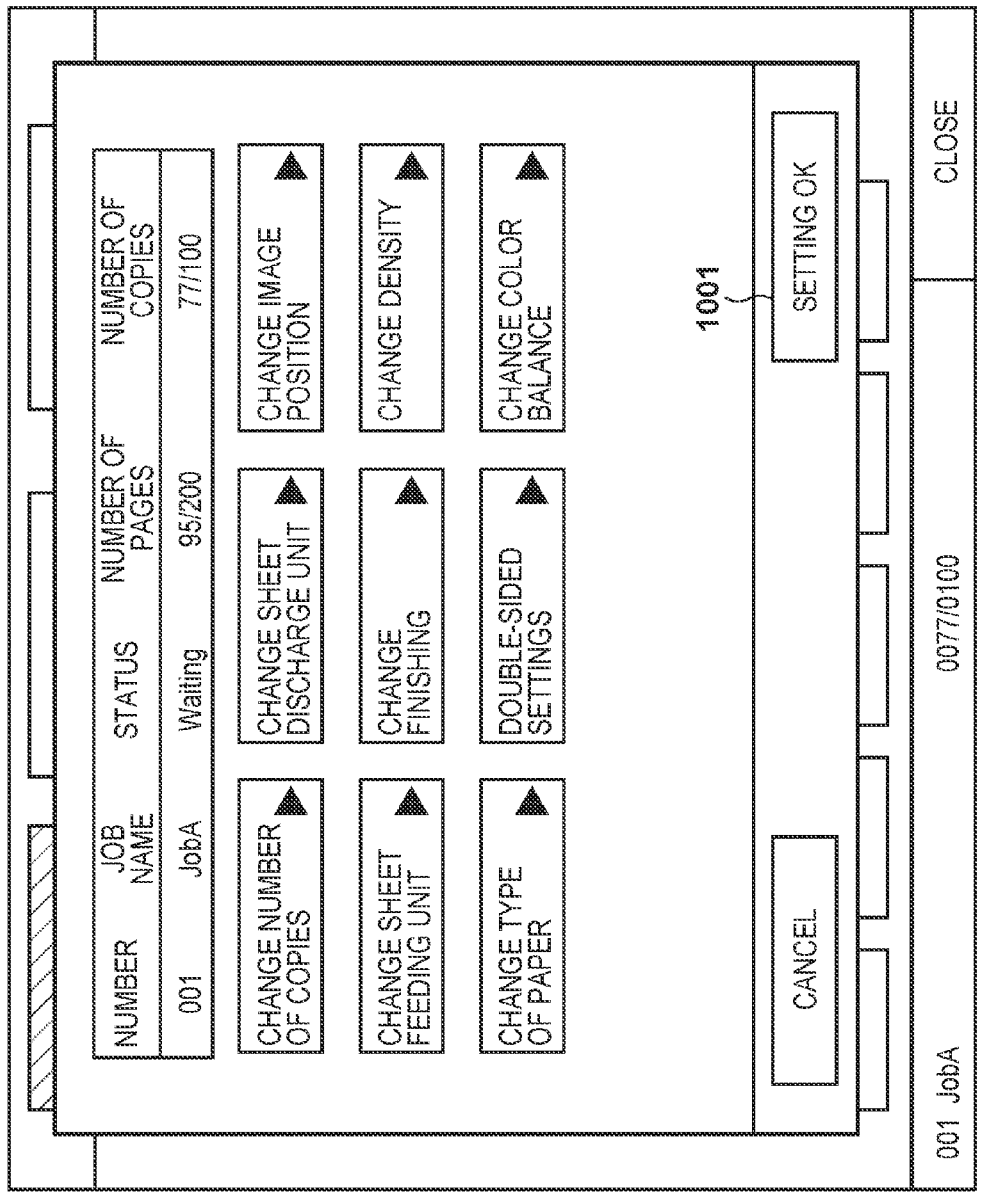
FIG. 10 is a diagram showing an example of a page setting change accepting screen.

Next, in step S804, the control unit 205 displays a page setting change accepting screen as shown in FIG. 10 on the touch panel unit 401 of the operation unit 204, and advances the processing to step S805. Furthermore, in step S805, the control unit 205 executes sheet feeding preparation stop processing according to the procedure shown in FIG. 7, and advances the processing to step S806.

In step S806, the control unit 205 determines whether or not the setting change has been completed, by determining whether or not a setting OK button 1001 has been pressed on the screen shown in FIG. 10. If it is detected that the setting OK button 1001 has been pressed, the control unit 205 determines that the setting change has been completed, and advances the processing to step S809. If, on the other hand, the setting OK button 1001 has not been pressed (No in step S806), and it is determined in step S807 that a predetermined period of time has passed, (or in other words, if it is detected that the setting OK button 1001 is not pressed for the predetermined period of time), the control unit 205 advances the processing to step S808.

Figure 7:
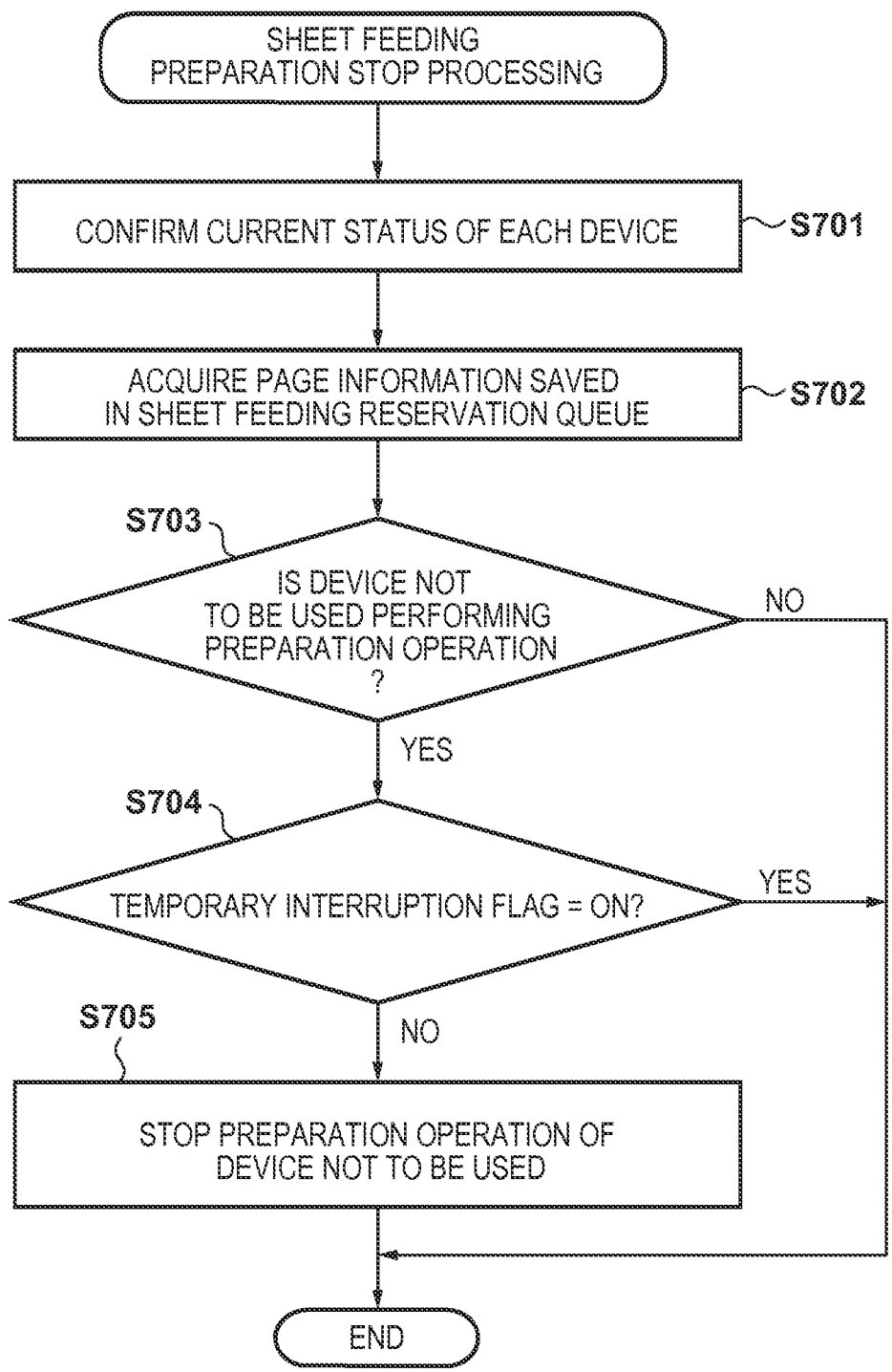
FIG. 7 is a flowchart illustrating a procedure of sheet feeding preparation stop processing executed by the printing system 100 according to the first embodiment.

In step S808, the control unit 205 sets the temporary interruption flag stored in the RAM 208 to OFF, returns the processing to step S805, and again executes sheet feeding preparation stop processing according to the procedure shown in FIG. 7. In this way, the control unit 205 controls the corresponding device so as to interrupt the currently executing preparation operation (step S705) by setting the temporary interruption flag to OFF if a predetermined period of time passes after interruption of execution of the print job.

On the other hand, in step S809, the control unit 205 saves page information (settings information) in which the setting change made at the time when the setting OK button 1001 was pressed is reflected, in the sheet feeding reservation queue as new page information. Furthermore, in step S810, the control unit 205 sets the temporary interruption flag stored in the RAM 208 to OFF, and advances the processing to step S811. In step S811, the control unit 205 executes sheet feeding processing according to the procedure shown in FIG. 6. By doing so, the control unit 205 restarts execution of the interrupted print job based on the changed page information.

As described above, according to the present embodiment, even if execution of a print job that is being executed is interrupted as a result of a page setting change with respect to the print job being accepted, the printing system 100 does not interrupt the preparation operation for executing the job. Accordingly, in the printing system 100, the preparation operation such as the sheet feeding preparation is continued at the time of restarting execution of the print job, and it is therefore possible to quickly restart execution of the print processing. In other words, even if a page setting change with respect to the print job that is being executed is accepted, it is possible to execute print processing in which the setting change intended by the user is reflected, without reducing the productivity of the print processing.

In the present embodiment, a case has been described, as an example, in which a page setting change is accepted, but the scope of application of the present embodiment is not limited thereto. The present embodiment is also applicable to a case in which, for example, execution of a job is interrupted in order to insert a new page, to remove printed sheets from the sheet discharge unit of the printing apparatus 150, or to remove sheets from the inside of the large capacity stacker 200b during execution of print processing. The present embodiment is also applicable to a case in which execution of a job is interrupted in order to execute print processing for confirming printing quality of the printing apparatus 150.

Second Embodiment

Figure 11:
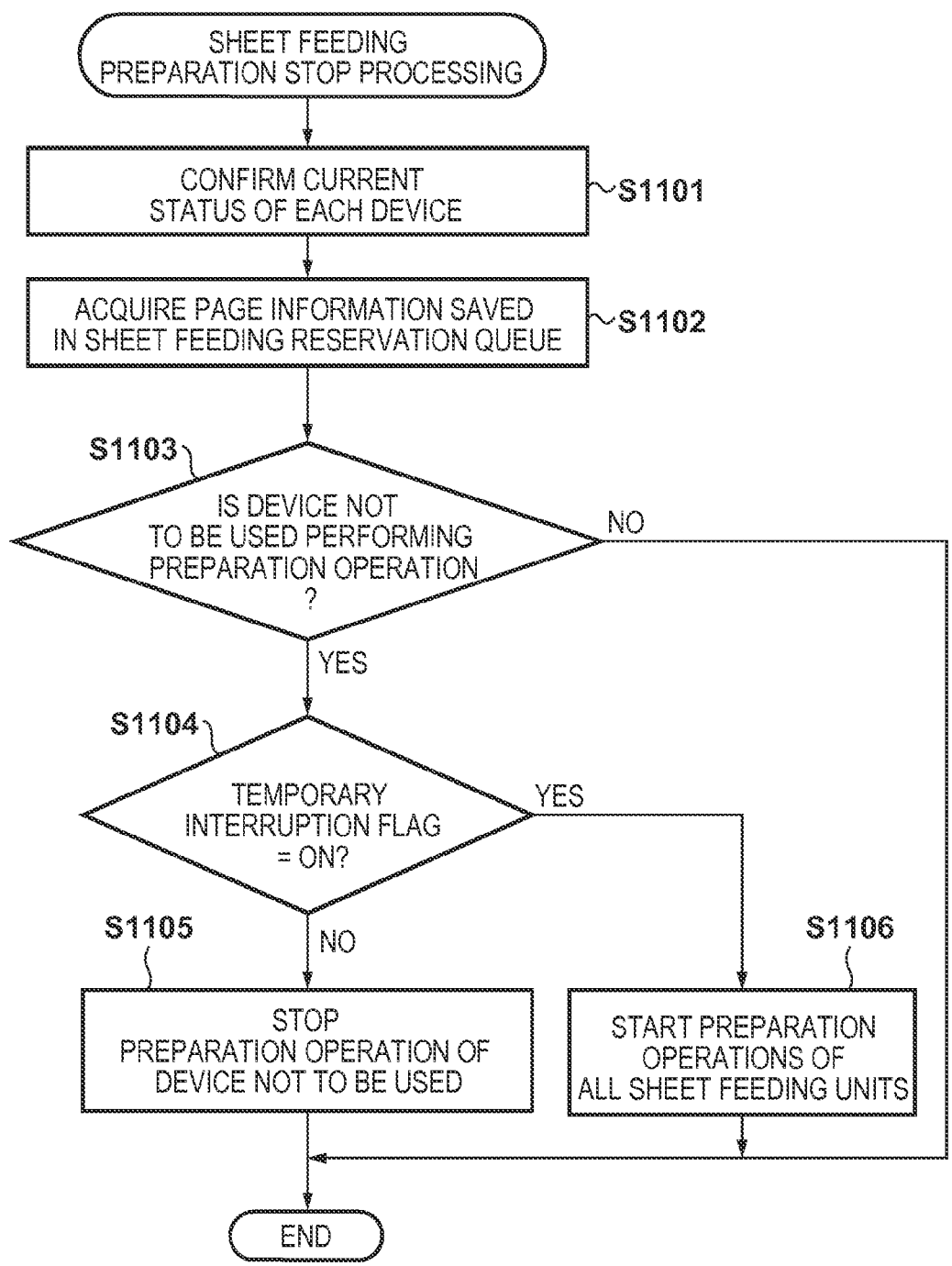
FIG. 11 is a flowchart illustrating a procedure of sheet feeding preparation stop processing executed by the printing system 100 according to the second embodiment.

Processing according to a second embodiment of the present invention executed by the printing system 100 shown in FIGS. 1 to 4 will be described next with reference to FIG. 11. In the present embodiment, if a specific sheet feeding unit is executing a preparation operation when a job is interrupted, the printing system 100 (the printing apparatus 150) controls the sheet feeding unit which is performing the preparation operation so as to continue the preparation operation without interrupting the preparation operation. Furthermore, the printing system 100 controls another sheet feeding unit other than the above sheet feeding unit so as to start a preparation operation. With this configuration, it is possible to quickly restart execution of the job even when the sheet feeding unit used in the job is changed to another sheet feeding unit by a page setting change.

In the present embodiment, the processing performed when a print job is received (FIG. 5), the sheet feeding processing (FIG. 6) and the setting change processing (FIG. 8) are the same as those of the first embodiment, and thus a description thereof is omitted here. In the present embodiment, the printing system 100 executes processing in accordance with the procedure shown in FIG. 11 instead of the procedure shown in FIG. 7 as sheet feeding preparation stop processing.

Sheet Feeding Preparation Stop Processing

The sheet feeding preparation stop processing executed by the printing system 100 will be described with reference to FIG. 11. Steps S1101 to S1104 are the same as steps S701 to S704. In step S1104, the control unit 205 confirms the temporary interruption flag stored in the RAM 208, and determines whether or not the temporary interruption flag is set to ON. If it is determined that the temporary interruption flag is set to ON, the control unit 205 advances the processing to step S1106. If it is determined that the temporary interruption flag is not set to ON (or in other words, set to OFF), the control unit 205 advances the processing to step S1105. In step S1105, the control unit 205 stops the preparation operation performed in the device (the sheet feeding unit, the sheet discharge unit and the printing apparatus 150) which is performing the preparation operation, and ends the processing. On the other hand, in step S1106, the control unit 205 starts the preparation operations of all sheet feeding units (the sheet feeding cassettes 317 and the sheet feeding decks 318) included in the printing system 100, and then ends the processing.

As described above, according to the present embodiment, at the time of interruption of execution of a print job that is being executed as a result of a page setting change with respect to the job being accepted, the printing system 100 continues or starts the preparation operations of all of the sheet feeding units of the printing system 100. With this configuration, even when the sheet feeding unit to be used in the job is changed to another sheet feeding unit, it is possible to quickly restart execution of the job.

OTHER EMBODIMENTS

The embodiments given above have been described using temperature adjustment as a preparation operation of the sheet feeding deck, but the preparation operation of the sheet feeding deck is not limited thereto. The preparation operation of the sheet feeding deck may be, for example, paper separation processing. The paper separation processing refers to processing for separating sheets one by one by blowing air to the sheets loaded in the sheet feeding deck for a predetermined period of time. After the paper separation processing, the sheets are sequentially attached to the conveyance belt by suction from the topmost sheet separated from the sheets, and then fed. This sheet feeding processing method is disclosed in Japanese Patent Laid-Open No. 2008-222399 mentioned above.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041938, filed Mar. 4, 2014, which is hereby incorporated by reference herein in its entirety.

What is claimed is:

1. A printing apparatus comprising:
an execution unit configured to execute sheet separation processing of sheets, the sheets being stored in a sheet storage unit and are to be used for printing by a print job;
a receiving unit configured to receive an interruption instruction while the print job is being executed;
an interrupting unit configured to interrupt execution of the print job based on the interruption instruction received by the receiving unit; and
a control unit configured to control the execution unit to continue the sheet separation processing which is being executed at a time when the execution of the print job is interrupted by the interrupting unit
wherein the execution unit, the receiving unit, the interrupting unit and the control unit are implemented by one or more processors.

2. The printing apparatus according to claim 1,
wherein the interruption instruction is an instruction to receive, from a user, a setting change of the print job being executed.

3. The printing apparatus according to claim 1,
wherein the interruption instruction is an instruction issued to remove a sheet on which an image has been printed from a sheet discharge unit of the printing apparatus.

4. The printing apparatus according to claim 1,
wherein a stacking apparatus in which a sheet conveyed from the printing apparatus is stacked is connected to the printing apparatus, and
the interruption instruction is an instruction issued to remove the sheet from inside of the stacking apparatus.

5. The printing apparatus according to claim 1,
wherein the interruption instruction is an instruction issued when executing print processing for confirming printing quality of the printing apparatus.

6. The printing apparatus according to claim 1,
wherein the sheet separation processing is processing for separating the sheets by blowing air to the sheets stored in the sheet storage unit.

7. The printing apparatus according to claim 1,
wherein the control unit interrupts the sheet separation processing that is being executed if a predetermined period of time has passed after interruption of the execution of the print job by the interrupting unit.

8. The printing apparatus according to claim 1,
wherein the printing apparatus includes a plurality of sheet storage units and
the control unit is configured to, in a case where the sheet separation processing for the sheet storage unit used by the print job is being executed at the time when the execution of the print job is interrupted by the interrupting unit, control the execution unit to continue the sheet separation processing and to start sheet separation processing for another sheet storage unit that is different from the sheet storage unit used by the print job.

9. A control method for controlling a printing apparatus, the method comprising:
executing sheet separation processing of sheets, the sheets being stored in a sheet storage unit and are to be used for printing by a print job;
receiving an interruption instruction while the print job is being executed;
interrupting execution of the print job based on the received interruption instruction; and
performing control to continue the sheet separation processing which is being executed at a time when the execution of the print job is interrupted.

10. A non-transitory computer-readable storage medium storing a computer program for causing a computer to execute steps of a control method for controlling a printing apparatus, the method comprising steps of:
executing sheet separation processing of sheets, the sheets being stored in a sheet storage unit and are to be used for printing by a print job;
receiving an interruption instruction while the print job is being executed;
interrupting execution of the print job based on the received interruption instruction; and
performing control to continue the sheet separation processing which is being executed at a time when the execution of the print job is interrupted.

* * * * *